US012230487B2

(12) United States Patent
Verster et al.

(10) Patent No.: US 12,230,487 B2
(45) Date of Patent: Feb. 18, 2025

(54) DETERMINING THE AVERAGE FREQUENCY OF A SERIES OF PULSES

(71) Applicant: Thermo Fisher Scientific (Bremen) GmbH, Bremen (DE)

(72) Inventors: Leanne Verster, Bremen (DE); Jonas Pistor, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 568 days.

(21) Appl. No.: 17/564,314

(22) Filed: Dec. 29, 2021

(65) Prior Publication Data

US 2022/0122826 A1 Apr. 21, 2022

Related U.S. Application Data

(63) Continuation-in-part of application No. 17/486,605, filed on Sep. 27, 2021, now abandoned.

(30) Foreign Application Priority Data

Oct. 1, 2020 (GB) ..................................... 2015555

(51) Int. Cl.
*H01J 49/00* (2006.01)
*H01J 49/42* (2006.01)

(52) U.S. Cl.
CPC ........ *H01J 49/0027* (2013.01); *H01J 49/421* (2013.01)

(58) Field of Classification Search
CPC ..... H01J 49/0027; H01J 49/421; H01J 49/022
(Continued)

(56) References Cited

U.S. PATENT DOCUMENTS 4,503,374 A * 3/1985 Sakano .................. G01P 3/489 318/603
9,431,976 B2 8/2016 Lerche
(Continued)

FOREIGN PATENT DOCUMENTS

EP 1851786 B1 11/2007

OTHER PUBLICATIONS

Extended EP Search Report dated Mar. 14, 2022, to EP Patent Application No. 21199719.2.
(Continued)

*Primary Examiner* — Michael Maskell
(74) *Attorney, Agent, or Firm* — ALG Intellectual Property, LLC

(57) ABSTRACT

A method and device for determining an average frequency of a series of ion detection pulses (P) in a spectrometer can be applied to a measurement interval (MI). The method may comprise determining the duration of an auxiliary interval (AI1, AI2, . . . ), wherein the auxiliary interval overlaps the measurement interval, the auxiliary interval starts at the last pulse (P0) preceding the measurement interval (MI), and the auxiliary interval ends at the last pulse (PN) within the measurement interval. The method may further comprise determining the number of pulses during the auxiliary interval and dividing the number of pulses by the duration of the auxiliary interval so as to produce the average frequency. The method may be applied to a series of ion pulses produced by a voltage-to-frequency converter connected to a Faraday cup.

17 Claims, 10 Drawing Sheets

(58) Field of Classification Search
USPC .................................................. 250/281, 282
See application file for complete search history.

(56) References Cited

U.S. PATENT DOCUMENTS

| | | | |
|---|---|---|---|
| 9,934,954 | B2 | 4/2018 | Schlueter |
| 2018/0308674 | A1 | 10/2018 | Schweiters |

OTHER PUBLICATIONS

Combined Search and Examination Report dated Mar. 3, 2021, issued to GB Patent Application No. 2015555.2.

* cited by examiner

DETERMINING THE AVERAGE FREQUENCY OF A SERIES OF PULSES

CLAIM TO PRIORITY

The present application is a continuation-in-part under 35 U.S.C. § 120 and claims the priority benefit of co-pending U.S. patent application Ser. No. 17/486,605 filed Sep. 27, 2021. U.S. patent application Ser. No. 17/486,605 claims the benefit of Great Britain patent application no. GB2015555.2, entitled "Determining the Average Frequency of a Series of Pulses," by Verster et al., and filed on Oct. 1, 2020. The content of the above-identified applications are incorporated herein by reference in their entirety.

FIELD OF THE INVENTION

The present invention relates to determining the average frequency of a series of pulses, such as detection pulses. More in particular, the present invention relates to a method of and a device for determining an average frequency of a series of pulses, such as pulses produced by a voltage-to-frequency converter, in particular in response to a detector signal. The present invention further relates to instruments, such as mass spectrometers, comprising at least one voltage-to-frequency converter.

BACKGROUND OF THE INVENTION

In mass spectrometry various detectors for detecting ions are known. The detected ions have typically been filtered and/or separated in accordance with their mass-to-charge (m/z) ratio. In typical multipole mass spectrometers, the multipole (for example a quadrupole or a hexapole) may scan through a range of m/z values. For each m/z value (or sub-range of m/z values), the quantity of ions is determined. The quantities of ions having different m/z values are therefore separated in time and determined sequentially. An example of a multipole mass spectrometer is disclosed in U.S. Pat. No. 9,934,954 (Thermo Fisher Scientific), which is incorporated herein by reference in its entirety.

Sector field mass spectrometers are capable of separating ions in space by applying, for example, a magnetic field which causes ions to follow curved trajectories, the radiuses of which depend on their m/z values. The quantities of ions having different m/z values can therefore be determined substantially simultaneously.

An example of a sector field mass spectrometer comprising an ion multicollector is disclosed in U.S. Pat. No. 10,867,780 (Thermo Fisher Scientific & University of Bristol), which is incorporated herein by reference in its entirety. This known mass spectrometer comprises an ion source for generating a beam of ions from a sample, a mass filter downstream of the ion source to select ions from the beam by their mass-to-charge ratio (m/z), a collision cell downstream of the mass filter, a sector field mass analyzer downstream of the collision cell and an ion multicollector downstream of the mass analyzer. The ion multicollector comprises a plurality of ion detectors for detecting a plurality of different ion species in parallel and/or simultaneously.

Several types of ion detectors are known, for example Faraday cups, compact discrete dynodes (CDDs) and secondary electron multipliers (SEMs). In some mass spectrometers, a plurality of Faraday cups is combined with one or two other types of ion detectors, the Faraday cups being used for ions occurring in larger quantities and the other type(s) of ion detector being used for ions occurring in smaller quantities.

The ions impinging on a Faraday cup can cause a small current to flow through a resistor which typically has a high resistance. The resulting voltage across the resistor is typically converted using a voltage-to-frequency converter (VFC) into a frequency which represents the voltage and hence represents the number of ions. Accordingly, each Faraday cup produces, through its associated VFC, an output signal consisting of pulses, the number of pulses per second representing the quantity of ions impinging on the particular Faraday cup.

Other types of ion detectors may also produce pulses which require counting to determine the number of ions impinging upon the detector within a certain time period. Compact discrete dynodes (CDDs) and secondary electron multipliers (SEMs), for example, produce pulses representing ion avalanches, the frequency of those pulses representing the quantity of ions.

Typically, the frequency of ion detection pulses may be determined by determining the number of pulses during a time period and then dividing the number of pulses by the duration of the time period. A technique used in practice is counting pulses during a predetermined time period which may also be referred to as integration time and which starts at the first pulse that occurs during a measurement interval. Such a measurement interval may also be referred to as measurement time or measurement period. As the first pulse of each of multiple parallel ion detectors typically occurs at a different point in time, the integration times of the ion detectors normally begin at different points in time. Letting the integration time begin at the first pulse during the measurement interval also means that part of the measurement interval is effectively not used.

In some embodiments of this technique, the integration time is a time period which has a predetermined minimum duration and which ends at the first pulse of the respective ion detector after the expiration of the minimum duration. Whether the integration time has a fixed duration or a duration which is also determined by the pulses, the beginning and the end of the integration times will vary per ion detector. To ensure uniform measurements when multiple ion detectors are used, any subsequent measurement interval cannot start before the integration periods of all ion detectors have ended. This means that a measurement interval will not end before the last integration period has finished, thus causing a dead time during which ion pulses of some detectors may not be counted. This may lead to a loss of accuracy. In addition, this dead time is a waste of valuable measurement time. As typically a plurality of successive measurement intervals is used to determine the number of ions, the time loss may become substantial, in particular when detectors receiving large numbers of ions (and thus producing pulses at small intervals) are used in parallel with detectors receiving small numbers of ions (and thus producing pulses at large intervals).

SUMMARY OF THE INVENTION

To solve these and other problems of the prior art, the present invention provides a method of determining in a spectrometer an average frequency of a series of ion detection pulses during a measurement interval, the method comprising:

determining the duration of an auxiliary interval, wherein the auxiliary interval overlaps the measurement interval, the auxiliary interval begins at the last pulse preceding the measurement interval, and the auxiliary interval ends at the last pulse of the measurement interval, determining the number of pulses during the auxiliary interval, and dividing the number of pulses by the duration of the auxiliary interval so as to produce the average frequency.

By using an auxiliary interval which starts at the pulse immediately preceding the measurement interval and ends at the last pulse of the measurement interval, which auxiliary interval thus overlaps the measurement interval, an accurate measure of the actual time duration of the pulses during the measurement interval is obtained. More importantly, as the auxiliary interval starts at the last pulse preceding the measurement interval, the auxiliary interval may effectively start before the beginning of the measurement interval. This provides the opportunity to effectively use the interval between the preceding pulse and the first pulse, thus avoiding a waiting period prior to the first pulse.

In addition, the last pulse of a measurement interval can be the pulse immediately preceding the next measurement interval. That is, any time interval between the last pulse of an auxiliary interval and the end of the corresponding measurement interval is therefore taken into consideration by the next measurement interval. There are in the method of the invention therefore no dead times, that is, no measurement gaps. In other words, using the interval between the preceding pulse and the first pulse, which may be referred to as start interval, allows a gapless series of measurements. Thus, valuable measurement time is saved.

Similarly, the interval between the last pulse of a measurement interval and the first pulse of the following measurement interval can be part of the auxiliary interval associated with the following measurement interval and can thus be included in the calculation.

It is noted that determining the number of pulses during an auxiliary interval preferably starts with the first pulse and ends with the last pulse of the corresponding measurement interval, and that the pulse immediately preceding the first pulse (that is, the reference pulse) is not included in the number of measured pulses. Conversely, if the reference pulse is included when determining the number of pulses, then the number of determined pulses has to be decreased by one ($n=n'-1$, where n is the number of determined pulses and n' is the number of pulses including the reference pulse).

In the discussion above it has been assumed that there is a preceding pulse, that is, that there is at least one pulse which occurs before the measurement interval begins. In the absence of a pulse before the measurement interval, the auxiliary interval may begin at the beginning of the measurement interval or at the first pulse within the measurement interval. That is, if there is no preceding pulse, at least not within a reasonable time period, then the auxiliary interval and the measurement interval may start at the same moment or the auxiliary interval may start at the first pulse if the pulse occurs after the start of the measurement interval.

Normally, at least one pulse will occur during a measurement interval, typically a plurality of pulses. However, in exceptional circumstances no single pulse may occur during a measurement interval, as a result of which there is no last pulse which would define the end of the auxiliary. Accordingly, in the absence of a pulse during the measurement interval, the auxiliary interval may end at the end of the measurement interval and the (average) frequency equals zero. In that particular case, the auxiliary interval and the measurement interval end at the same moment. Alternatively, in the absence of a pulse during the measurement interval, the auxiliary interval may end at the first pulse following the measurement interval, in which case the end time is negative and the (average) frequency of the measurement interval may be equal to zero. In such a scenario, the auxiliary interval may have a duration which is substantially greater than the measurement interval, for example twice, three times, four times or more times greater. In contrast, when several pulses appear within each measurement interval, its duration will not differ much from that of its associated auxiliary interval.

The last pulse of a measurement interval will typically be the last pulse within the measurement interval but may thus in some cases be the first pulse after the measurement interval. It is noted that a measurement interval without a single pulse could still have a preceding pulse defining the beginning of the auxiliary interval.

The method of the invention could be used for a single measurement interval only. However, the method is preferably used for consecutive measurement intervals. In that way, the absence of a gap between the actual measurements is fully used. Instead of, or in addition to consecutive measurement intervals, overlapping measurement periods may be used for parallel measurements. That is, two or more series of pulses may be processed in parallel to determine their respective average frequencies, or to determine an average frequency of some or all of the series.

The invention could be used for only determining a number of ion detection pulses during a measurement interval, by omitting the step of dividing the number of pulses by the duration of the auxiliary interval so as to produce the average frequency. Thus, the invention is not limited to determining a frequency but can also be used for accurately determining a number of pulses.

The pulses may be produced by at least one voltage-to-frequency converter, which may be known per se. The at least one voltage-to-frequency converter may be coupled to a Faraday cup for detecting ions, preferably via an amplifier having a high input resistance. An example of such an amplifier is disclosed in U.S. Pat. No. 9,431,976 (Thermo Fisher Scientific), which is incorporated herein by reference in its entirety. It is preferred that each Faraday cup (or similar detector) is connected to an individual amplifier, which is in turn connected to an individual voltage-to-frequency converter, but arrangements with shared amplifiers and/or shared voltage-to-frequency converters may also be used in some embodiments.

Parallel voltage-to-frequency converters can produce parallel series of pulses. The average frequency of each series of pulses may be determined in an individual measurement interval. Those individual measurement intervals preferably overlap and may start and stop at the same points in time but may in some embodiments start and stop at different points in time.

In some embodiments, the pulses may be produced by a compact discrete dynode (CDD) detector and/or a secondary electron multiplier (SEM) detector.

The duration of the auxiliary interval may be determined in several ways. In an embodiment, determining the duration of the auxiliary interval may comprise:

determining the duration of a start interval between the last pulse preceding the measurement interval and the beginning of the measurement interval, determining the duration of an end interval between the last pulse of the measurement interval and the end of the measurement interval, adding the duration of the start interval to the duration of the measurement interval, and subtracting the duration of the end interval from the duration of the measurement interval to obtain the duration of the auxiliary interval.

In this embodiment, a start interval preceding the beginning of the measurement interval and an end interval preceding the end of the measurement interval are used to determine the duration of the auxiliary interval. The start interval can be said to represent the extension of the auxiliary interval due to the fact that the auxiliary interval is counted from the last pulse preceding the measurement interval. The end interval can be said to represent the shortening of the auxiliary interval due to the fact that the auxiliary interval ends at the last pulse of the measurement interval and may not extend until the end of the measurement interval. It will be understood that each of the start interval and the end interval may have a zero length.

In some embodiments, determining the duration of the start interval and/or determining the duration of the end interval comprises using at least one timer. That is, a first timer may be used to determine the duration of the start interval while a second timer may be used to determine the duration of the end interval. In some embodiments, however, a single timer may be used to determine both intervals. A timer may be constituted by a counter arranged for counting pulses, such as clock pulses, having a relatively high frequency. In this context, a relatively high frequency is at least 10 times as high as the highest expected frequency of the pulses, preferably at least 100 times as high, more preferably at least 1000 times as high. A timer could additionally, or alternatively, be implemented in software.

The method may further comprise resetting the at least one timer at each pulse. Although the at least one timer could be left running at each pulse, it is preferred to reset the timer each time a pulse is detected. This reduces the risk that the counter value will exceed its maximum value, thus producing an incorrect result.

The duration of the measurement interval, or of at least one measurement interval, may be predetermined. That is, the duration may be known in advance, thus eliminating the need to determine the duration of each measurement interval. In some embodiments, the duration of the measurement interval is not known in advance, or not known precisely, and needs to be determined. Accordingly, the duration of the measurement interval, or of at least one measurement interval, may be determined using a further timer. The further timer may be constituted by a counter arranged for counting pulses, such as clock pulses, having a relatively high frequency. In this context, a relatively high frequency is at least 10 times as high as the highest expected frequency of the pulses, preferably at least 100 times as high, more preferably at least 1000 times as high.

As mentioned above, the duration of the auxiliary interval may be determined in several ways. In an embodiment, determining the duration of the auxiliary interval may comprise:

starting a timer at the beginning of the auxiliary interval, and recording the value of said timer at the end of the auxiliary interval, wherein the recorded value of said timer represents the duration of the auxiliary interval.

In such an embodiment, the duration of the start interval and/or the duration of the end interval may not be determined, or at least not directly. A single timer may be used for each auxiliary interval, or timers may be shared by auxiliary intervals. In some embodiments, a timer may be used for alternating auxiliary intervals.

Determining the duration of a consecutive auxiliary interval may comprise:

starting a further timer at the beginning of the consecutive auxiliary interval, and recording the value of said further timer at the end of the consecutive auxiliary interval, wherein the recorded value of said further timer represents the duration of the consecutive auxiliary interval.

The timer and the further timer may be used alternatingly. Conversely, each of the timer and the further timer may be used for alternating intervals. The timer and/or the further timer may be constituted by a counter arranged for counting pulses, such as clock pulses, having a relatively high frequency. In this context, a relatively high frequency is at least 10 times as high as the highest expected frequency of the pulses, preferably at least 100 times as high, more preferably at least 1000 times as high.

The present invention also provides a computer program product for carrying out the method described above. The computer program product may comprise a tangible carrier, such as a DVD or a memory stick, on which instructions are stored which allow a processor to carry out the method of the invention. The computer program product may additionally, or alternatively, be available in downloadable form on a server, for example a server connected to the internet.

The present invention additionally provides a device for determining in a spectrometer an average frequency of a series of ion detection pulses during a measurement interval, the device comprising:

circuitry for determining the duration of an auxiliary interval, wherein the auxiliary interval overlaps the measurement interval, the auxiliary interval begins at the last pulse preceding the measurement interval, and the auxiliary interval ends at the last pulse within the measurement interval, circuitry for determining the number of pulses during the auxiliary interval, and optionally circuitry for dividing the number of pulses by the duration of the auxiliary interval so as to produce the average frequency.

It is noted that dividing the number of pulses by the duration of the auxiliary interval may be carried out in software, using the output of the circuitry for determining the duration of an auxiliary interval and the circuitry for determining the number of pulses during the auxiliary interval. In that case, the circuitry for dividing the number of pulses by the duration of the auxiliary interval may be omitted.

The device may further comprise circuitry for receiving the pulses from a voltage-to-frequency converter. An input of the voltage-to-frequency converter may receive an input voltage, via an amplifier, from at least one ion detection element, such as a Faraday cup.

The circuitry for determining the duration of the auxiliary interval may comprise:

a start timer for determining the duration of a start interval between the last pulse preceding the measurement interval and the beginning of the measurement interval, an end timer for determining the duration of an end interval between the last pulse preceding the measurement interval and the beginning of the measurement interval, and a combinatorial circuit for adding the duration of the start interval to the duration of the measurement interval and subtracting the duration of the end interval from the duration of the measurement interval, to obtain the duration of the auxiliary interval.

The start timer and the end timer may be constituted by a combination of a single timer and a flip-flop, wherein:

a clear input of the timer is arranged to receive the pulses, a data input of the flip-flop is connected to an output of the timer, an enable input of the flip-flop is arranged to receive a measurement initiation pulse representing the beginning of the measurement interval, and the output of the timer and the output of the flip-flop are each connected to an input of the combinatorial circuit so as to produce the difference between the start interval and the end interval.

The device may further comprise an additional flip-flop, wherein:

the combinatorial circuit is arranged to receive the duration of the measurement interval, a data input of the additional flip-flop is connected to an output of the combinatorial circuit, an enable input of the flip-flop is arranged to receive the measurement initiation pulse representing the beginning of the measurement interval, so that an output of the flip-flop produces the duration of the auxiliary interval.

The device may further comprise an additional timer for determining the duration of the measurement interval, wherein:

a clear input of the additional timer is arranged to receive the measurement initiation pulse representing the beginning of the measurement interval, and an output of the additional timer is connected to an input of the combinatorial circuit, so that the additional timer supplies the duration of the measurement interval to the combinatorial circuit.

In an alternative embodiment, the circuitry for determining the duration of the auxiliary interval may comprise:

a first timer and a second timer for producing a first timer value and a second timer value respectively, a multiplexer for selecting one of the first timer value and the second timer value, a flip-flop for recording the selected timer value at the end of the auxiliary interval, and a logic unit for supplying control signals to the timers, the multiplexer and the flip-flop, wherein the device is arranged for:

clearing the second timer at each detection pulse during a first measurement interval, and clearing the first timer at each detection pulse during a second, subsequent measurement interval, wherein the first timer value at the end of the first measurement interval represents the duration of the associated auxiliary interval.

In this embodiment, each timer is active (that is, is not cleared) in alternating measurement intervals. In each measurement interval, one time is active while the other one is not active (that is, is cleared at each detection pulse). It is noted that both the "active" and the "not active" timer are counting, but that at the end of the measurement interval the recorded value of the "active" timer represents the duration of the auxiliary interval, while the value of the "inactive timer" represents the time since the last detection pulse. The latter is an important aspect of the invention as in case of two subsequent measurement intervals, the time since the last detection pulse at the end of a first measurement interval represents the time since the preceding detection pulse at the beginning of the next measurement interval, so the extension slot which is to be used to determine the auxiliary interval.

In this embodiment it is preferred that during a first measurement interval the second timer is cleared at each detection pulse while the first timer is not cleared, while during a second, subsequent measurement interval the first timer is cleared at each detection pulse while the second timer is not cleared. Thus, in each measurement interval, one timer is used while the other is cleared, the timers being used alternatingly in successive intervals.

The present invention also provides a spectrometer comprising a device or circuitry as described above. The spectrometer may be a mass spectrometer, such as a sector field mass spectrometer, or a multipole mass spectrometer, for example. A spectrometer according to the invention may further comprise at least one compact discrete dynode, and/or at least one secondary electron multiplier, and circuitry for counting pulses produced by the at least one compact discrete dynode and/or at least one secondary electron multiplier during a measurement interval.

The present invention further comprises a software program product comprising instructions allowing a processor to carry out one or more method parts as described above. The software program product may comprise a tangible carrier, such as a DVD or a memory stick. In some embodiments, the software program product may be arranged for being downloaded from a server.

DETAILED DESCRIPTION OF THE DRAWINGS

The present invention provides methods and devices for determining the number of pulses of a series of pulses and/or the average frequency of a series of pulses, for example ion detection pulses and/or pulses produced by one or more voltage-to-frequency converters in response to ion detection signals. The number of pulses and/or the average frequency is to be determined during one or more time intervals, which are referred to as measurement intervals. The distribution of pulses during the measurement intervals may be random. To utilize the available time more efficiently, the invention proposes to use auxiliary time intervals which overlap the measurement intervals and are effectively synchronized with the pulses. According to the invention, the number of pulses during an auxiliary interval is divided by the duration of the auxiliary interval to arrive at the average frequency during the auxiliary interval. The auxiliary interval is chosen in such a way that the average frequency during the measurement interval equals the average frequency during the overlapping auxiliary interval. The average frequency thus determined can be a measure of an ion current in a spectrometer. The present invention thus allows an ion current to be determined accurately.

Figure 1:
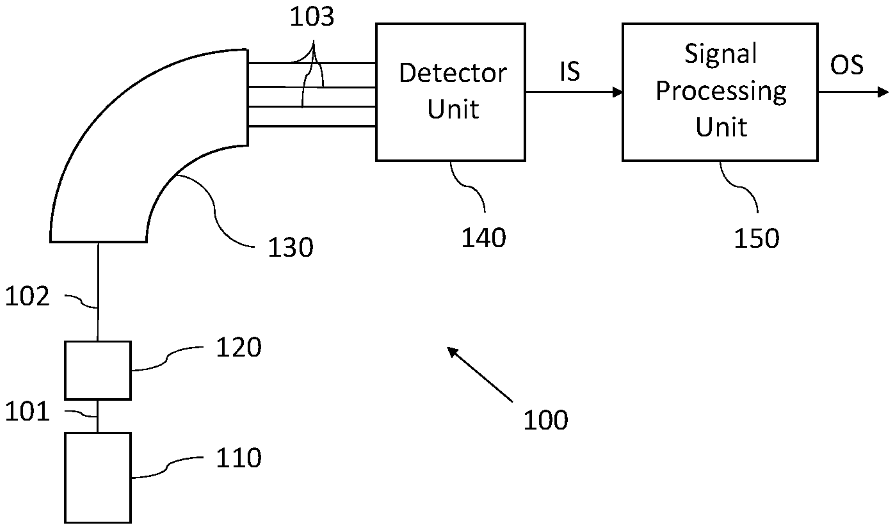
FIG. 1 schematically shows a mass spectrometer in which the invention may be applied.

A mass spectrometer in which the invention may be applied is, by way of example, schematically illustrated in FIG. 1. The mass spectrometer 100 is shown to comprise an ion source 110, a beam focusing unit 120, a magnetic sector unit 130, a detector unit 140, and a detector signal processing unit 150. The ion source 110 may be a plasma source, such as an inductively coupled plasma (ICP) source, or a non-ICP source, such as a filament source. The ion source 110 is arranged for producing an original ion beam 101 which is focused by the beam focusing unit 120 to become a focused ion beam 102. The beam focusing unit 120 can comprise suitable ion optics which may be known per se. A mass filter (not shown) may optionally be arranged between the beam focusing unit 120 and the magnetic sector unit 130, see also the above-mentioned U.S. Pat. No. 10,867,780.

In the magnetic sector unit 130, ions contained in the ion beam 102 may be separated according to their respective masses. Thus, the single focused ion beam 102 entering the magnetic sector unit 130 is split up into multiple ions beams 103 which may reach different detectors of the detector unit 140, allowing ions having different masses to be detected separately. The detector unit 140 produces ion detection signals IS which can be amplified and further processed in the signal processing unit 150, resulting in output signals OS which may include an average detection frequency per ion detector, and hence per ion mass range.

Instead of, or in addition to a sector field unit, such as the magnetic sector unit 130, a mass filter unit such as a multipole unit (for example a quadrupole unit) may be used.

Figure 2:
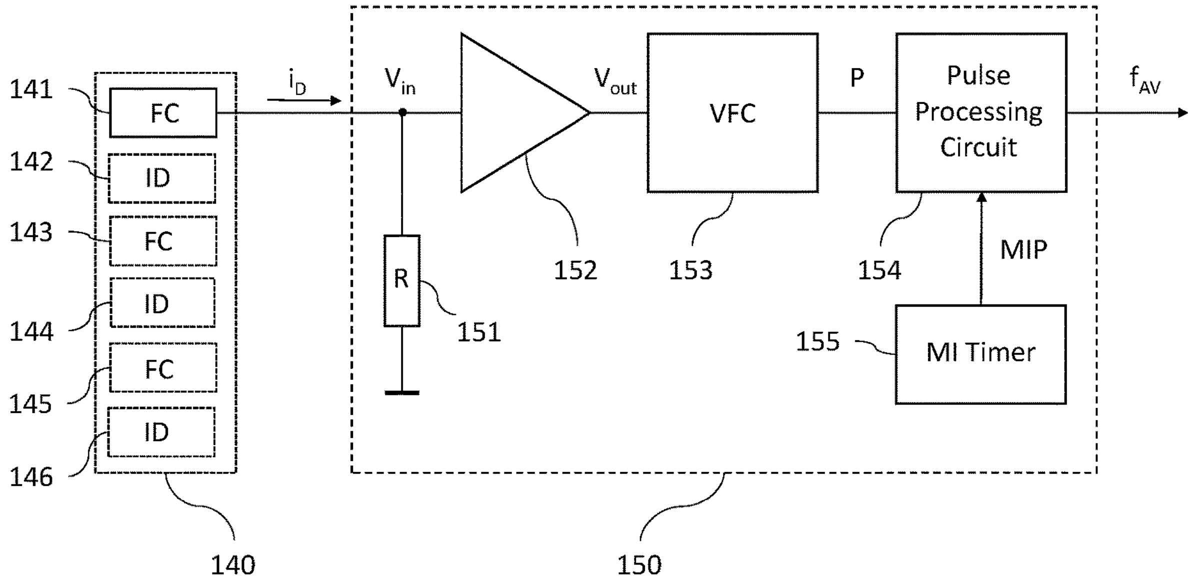
FIG. 2 schematically shows part of the mass spectrometer of FIG. 1 in more detail.

Part of the mass spectrometer 100 of FIG. 1 is shown in more detail in FIG. 2. In particular, FIG. 2 schematically shows part of the detector unit 140 and part of the signal processing unit 150.

The detector unit 140 is shown to comprise Faraday cups (FC) 141, 143 and 145, and additional ion detectors (ID) 142, 144 and 146. The detector unit 140 may comprise more (or less) Faraday cups and/or more (or less) additional ion detectors than shown here. In the example shown, the additional ion detectors are each arranged next to a Faraday cup, but this is not essential. The additional ion detectors may comprise compact discrete dynodes (CDDs) and/or secondary electron multipliers (SEMs).

As is well known, Faraday cups and similar ion detectors produce small currents proportional to the number of impinging ions. These small currents, typically in a range from 1 fA to 1 nA, are converted into a voltage which is then amplified to produce an ion detection voltage. To this end, the signal processing unit 150 comprises an input resistor 151 which has a very large value, typically in a range from 100 GΩ to 10 TΩ. Such large resistor values are necessary to produce a suitable voltage for further processing: a current of 1 pA ($10^{-12}$ A) flowing through a resistor of 1 TΩ ($10^{+12}$Ω) produces a voltage across the resistor of just 1 V.

The detector current $i_D$ produced by the Faraday cup 141 is, in the schematic diagram of FIG. 2, fed through the input resistor 151 to ground and produces across the resistor 151 an input voltage $V_{in}$ for the amplifier 152. It is noted that the amplifier 152 is drawn here only schematically, and that the amplifier 152 may comprise an operational amplifier having the input resistor 151 in its negative feedback loop, thus connecting the resistor 151 to ground via the operational amplifier (virtual ground). It is further noted that only a single input resistor 151 and a single amplifier 152 are shown here for the sake of simplicity of the drawing, but it will be understood that each Faraday cup or similar detector 141, 143 and 145 of the detector unit 140 may be connected to an individual input resistor 151 and an individual amplifier 152. In some embodiments, two or more Faraday cups may share an input resistor and an amplifier. The ion detectors 142, 144 and 146 may each be connected to a discriminator, which may in turn be connected to a counter (not shown in FIG. 2).

The amplifier 152 produces an output voltage $V_{out}$ which may be equal to, or larger than the input voltage $V_{in}$, for example 10 or 100 times larger. If the output voltage $V_{out}$ has substantially the same magnitude as the input voltage $V_{in}$, the amplifier 152 may be used as a buffer only. The output voltage $V_{out}$ is fed to a voltage-to-frequency converter (VFC) 153, which produces pulses P with a frequency proportional to the voltage $V_{out}$. It has been found that VFCs have a high degree of linearity which makes accurate detections possible. It is noted that detector signals originating from some types of detectors, such as compact discrete dynodes (CDDs) and/or secondary electron multipliers (SEMs), are typically not fed to a VFC.

The pulses P produced by the VFC 153 are fed to a pulse processing circuit 154 which determines the average frequency of the pulses produced by the VFC 153 during certain time periods, which will be referred to as measurement intervals. For each time period, the pulse processing circuit 154 produces an average frequency fA. The average frequency represents the number of ions that impinged upon the corresponding detector during that particular time period. To determine the average frequency, the pulse processing circuit may count the number of pulses during a time period, determine the duration of that time period, and divide the number of pulses by the duration, as will later be explained in more detail. A measurement interval timer 155 provides measurement interval pulses MIP to the pulse processing circuit 154. In an embodiment, the measurement interval timer 155 provides a measurement interval pulse MIP at the beginning of each measurement interval, that is, at each beginning of the measurement interval, as will later be explained in more detail with reference to FIG. 4. The frequency of the measurement interval timer 155, and hence the duration of the measurement intervals, may be predetermined or set by a user. In some embodiments, the measurement interval pulses are generated externally to the signal processing unit 150 and the measurement interval timer 155 may be omitted.

Figure 3:
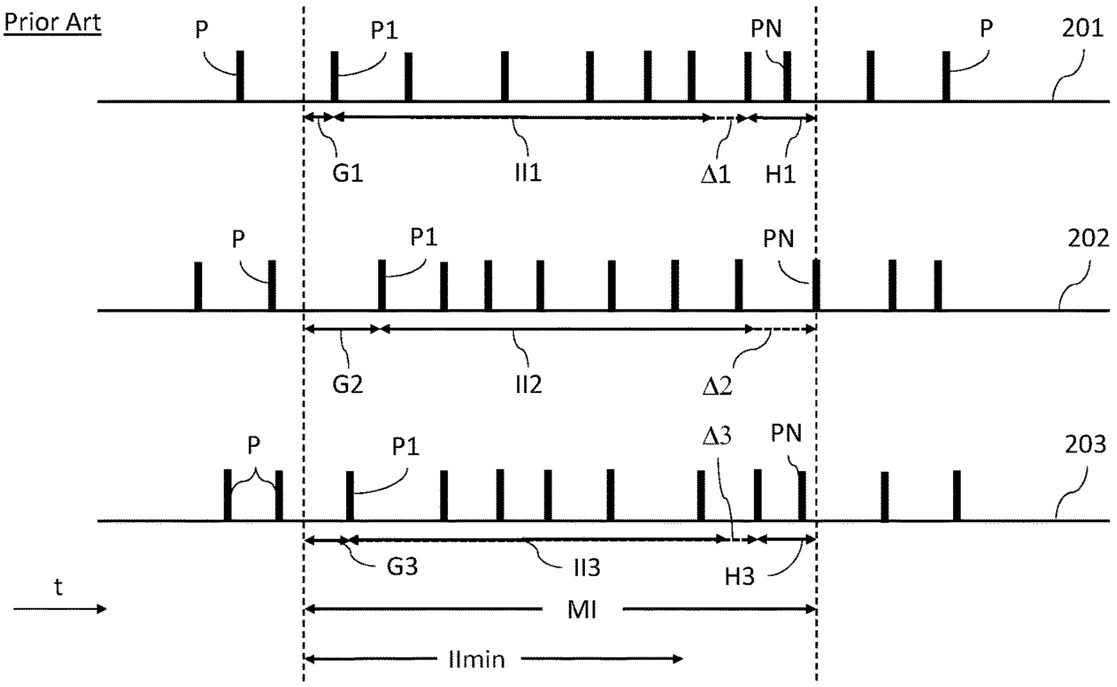
FIG. 3 schematically shows a timing diagram of ion detection pulses according to the prior art.

A conventional method of determining an average frequency of ion detection pulses is schematically illustrated in FIG. 3, where the ion detection pulses P produced by the VFCs of each of the Faraday cups 141, 143 and 145 of FIG. 2 are shown as pulse series 201, 202 and 203 respectively. The respective average frequencies of each of these pulse series is determined during a measurement interval MI. To ensure a proper measurement, also when very few pulses are produced, counting the number of pulses during the measurement interval takes place in a shorter time interval which may be referred to as integration interval II. The integration interval Hof a series of pulses starts at the first pulse P1 of that series within the measurement interval MI. This leaves an initial gap G between the beginning of the measurement interval MI and the first pulse P1. In the example shown, an initial time gap G1 is present between the beginning of the measurement interval MI and the beginning of the first integration interval 111. As the pulses of a series are typically independent of the pulses of other series, the integration intervals of the respective series can start at different points in time, resulting in different initial gaps.

The integration intervals II1, II2 and II3 shown in FIG. 3 have an identical predetermined minimum length IImin but end at the first pulse PN following the minimum length (unless the interval having a minimum length ends at a pulse). This causes the integration intervals II1, II2 and II3 to have extensions D1, D2 and D3 respectively, which are shown as interrupted lines in FIG. 3. The first integration interval II1, for example, has a length equal to the minimum length IImin (indicated with a solid line) plus the time extension D1. A time interval IImin having a minimum duration is also schematically shown in FIG. 3. It is noted that the first pulse PN following the minimum length of the integration interval is not necessarily the last pulse within the measurement interval, this depends on the relative lengths of the integration interval and the measurement interval.

As the integration intervals start at different points in time and can have different lengths, they also end at different points in time. As can be seen in FIG. 3, after each integration interval follows a different final time gap H until the end of the measurement period MI. In the example shown, the first final time gap H1 after the first integration period II1 is greater than the third final time gap H3 after the third integration period II3. In the example shown, the second final time gap H2 is equal to zero, as the measurement interval MI is set to end when the last integration interval II ends. It will be clear that when more parallel series of pulses are processed than the three illustrated in FIG. 3, the lengths of the gaps will increase and the efficiency of the method will decrease.

In the conventional method of FIG. 3, the average frequency of the pulses of each measurement interval is calculated by counting the number of pulses during the corresponding integration interval, determining the duration of the integration interval (e.g. determining the sum of II1 and D1) and dividing the number of pulses by the duration of the integration interval. Although this method provides reliable results, it has the disadvantage that part of the measurement interval is not used. In particular, the initial time gap G (e.g. G3) and the final time gap H (e.g. H3) are not used, which causes the determination of the average frequency to be delayed. In addition, the pulses in the final gaps (H1 and H3 in the example shown) will not be included in the calculation. It is noted that the time gaps G and H may in practice be substantially larger than schematically illustrated in FIG. 3.

Figure 4:
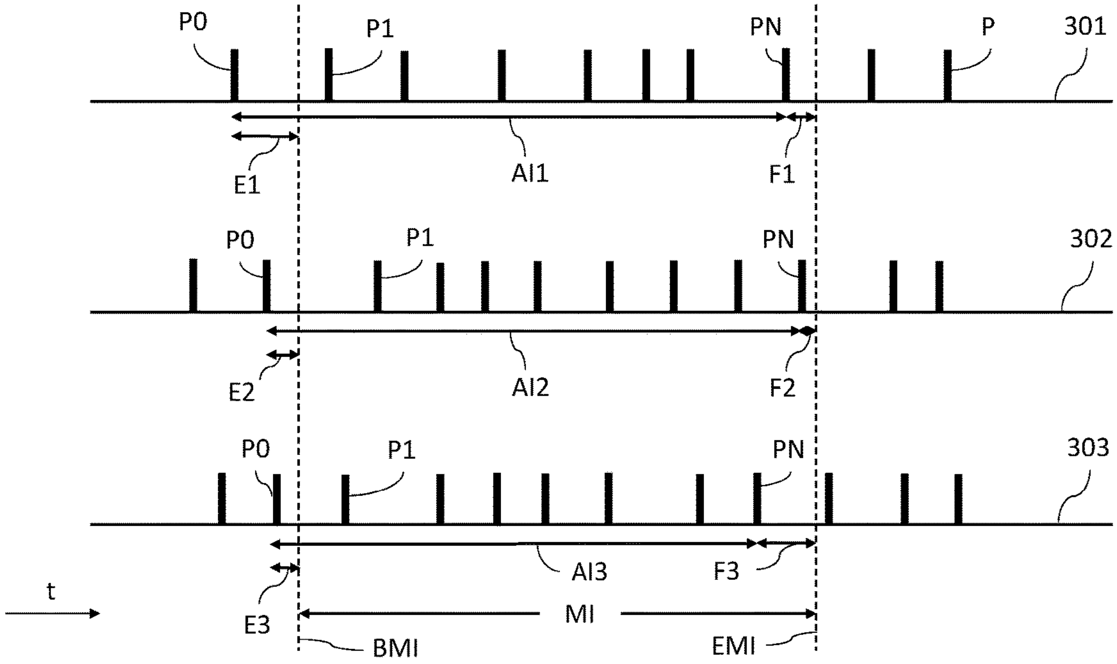
FIG. 4 schematically shows a first timing diagram of ion detection pulses according to the invention.

The invention seeks to overcome these disadvantages. An embodiment of the method of the invention is schematically illustrated in FIG. 4. Similar to FIG. 3, three series of ion detection pulses P are schematically illustrated in FIG. 4: a first series 301, a second series 302 and a third series 303, which series occur in parallel and substantially simultaneously. As in FIG. 3, the average number of pulses is to be determined within a measurement interval MI. To this end, the invention utilizes auxiliary intervals AI during which the number of pulses P is counted. In the example shown, three auxiliary intervals AI1, AI2 and AI3 are shown. The measurement interval MI is shown to comprise a beginning BMI and an end EMI.

In contrast to the integration intervals of the prior art, illustrated in FIG. 3, the auxiliary intervals AI of the invention each start at the last pulse preceding the measurement interval. That is, each auxiliary interval typically starts before the corresponding measurement interval starts (in some embodiments, however, an auxiliary interval and a measurement interval may start at the same moment if a pulse coincides with the beginning of a measurement interval or even later if there is no preceding pulse, as will be discussed later). As a result, most auxiliary intervals comprise an extension slot E1, E2, E3 preceding the measurement interval. In FIG. 4, the extension slot E1 is a time period which is shown to start at the preceding pulse P0 and end at the beginning BMI of the measurement interval.

By starting the auxiliary intervals at the last pulse preceding the measurement interval, and thus introducing an extension slot preceding the measurement interval, an initial gap (such as G1 in FIG. 3) within the measurement interval and thus a loss of measurement time as in the prior art is avoided. As the auxiliary intervals start before the measurement intervals, or simultaneously with the measurement interval at the latest, it is no longer necessary to wait for the last integration period to start, which could take a relatively large amount of time if pulses appeared infrequently in a certain series.

In accordance with the invention, an auxiliary interval ends at the last pulse of the measurement interval, which is typically the last pulse within the measurement interval, unless there is no pulse during the measurement interval. This leaves a final slot F between the last pulse and the end EMI of the measurement interval, which is similar to the final time gap H of the prior art (see FIG. 3). However, as will be explained with reference to FIG. 5, the final slot F according to the invention is not necessarily wasted measurement time as in the prior art but may be utilized during the next measurement interval. It is noted that the final slot F may be referred to as end interval, while the extension slot E may be referred to as start interval.

Even when the final slot F is not utilized during the next measurement interval, it can be seen that the invention uses the measurement interval more effectively by starting at the preceding pulse P0 instead of at the first pulse P1.

Figure 5:
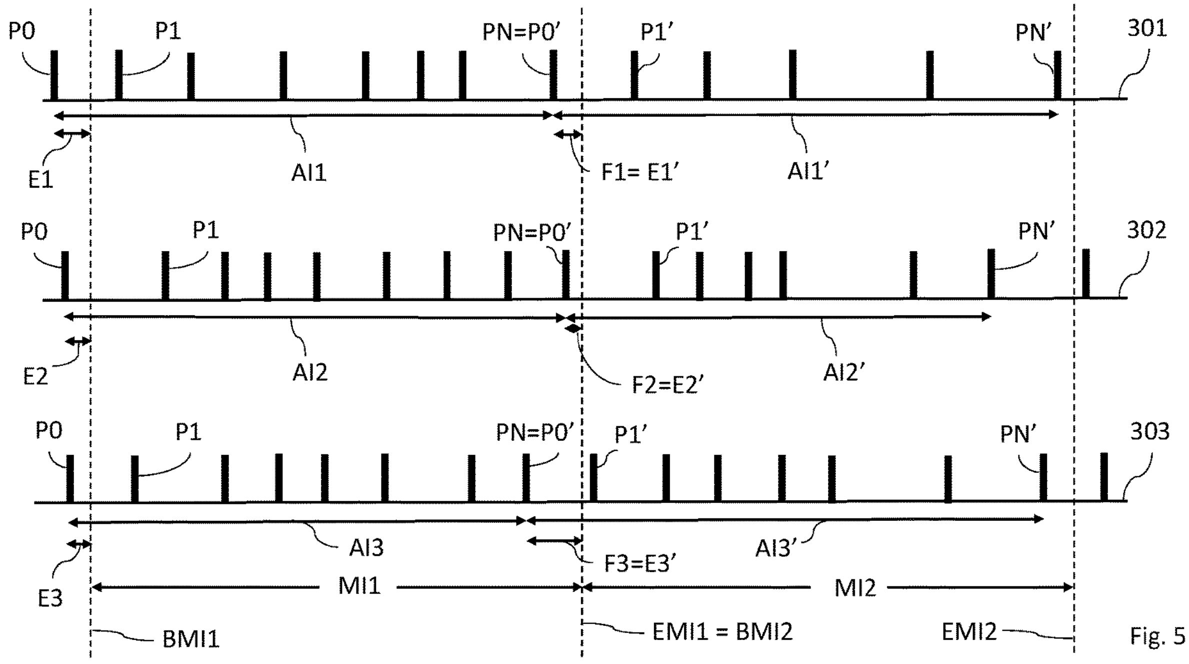
FIG. 5 schematically shows a second timing diagram of ion detection pulses according to the invention.

As illustrated in FIG. 5, two (or more) measurement intervals MI1 and MI2 can be immediately adjacent to each other, without any intermediate gap, and use the advantages of the invention. In the example shown in FIG. 5, the end EMI1 of the first measurement interval MI1 coincides with the beginning BMI2 of the second measurement interval MI2. In accordance with the invention, the final slot (e.g. F3) in the first measurement interval MI1 is equal to the initial time gap (e.g. E3') in the second measurement interval MI2. It can also be seen in FIG. 5 that the auxiliary interval (e.g. AI3') of the second measurement interval MI2 immediately follows the auxiliary interval (e.g. AI3) of the first measurement interval MI1. As the invention allows the auxiliary intervals to be immediately adjacent, without any intermediate gap, no measurement time is wasted and the average frequency is obtained as quickly and accurately as possible.

Although in FIG. 5 only two subsequent measurement intervals are shown for the sake of simplicity of the drawings, it will be understood that more than two subsequent measurement intervals can be used, such as three, four, five, fifty or more measurement intervals without intermediate time gaps.

Figure 6:
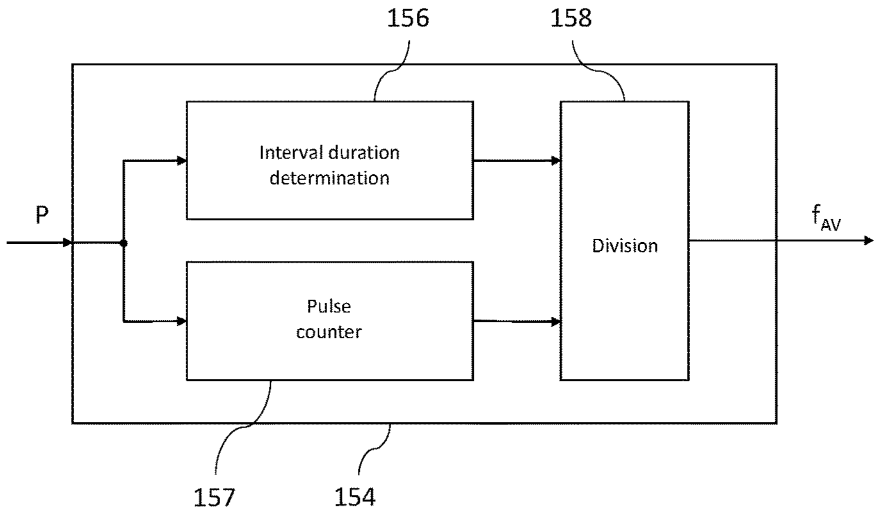
FIG. 6 schematically shows a pulse processing arrangement according to the invention.

The arrangement 150 of FIG. 2 comprises a pulse processing unit 154 for receiving one or more series of pulses and producing an average frequency of each series of pulses. An exemplary embodiment of the pulse processing unit 154 is shown in more detail in FIG. 6. The pulse processing unit 154 of FIG. 6 is shown to comprise an interval duration determination unit 156 for determining the duration of an auxiliary interval, which auxiliary interval overlaps the measurement interval as shown in FIGS. 4 & 5, a pulse counter 157 for determining the number of pulses P during the auxiliary interval, and a division unit 158 for dividing the number of pulses by the duration of the auxiliary interval so as to produce the average frequency fay. The pulse counter 157 may be constituted by a commercially available counter while the division unit 158 may be constituted by a commercially available division circuit, or by a suitably programmed microprocessor. The interval duration determination unit 156 will be explained with reference to FIGS. 7 & 8.

Figure 7:
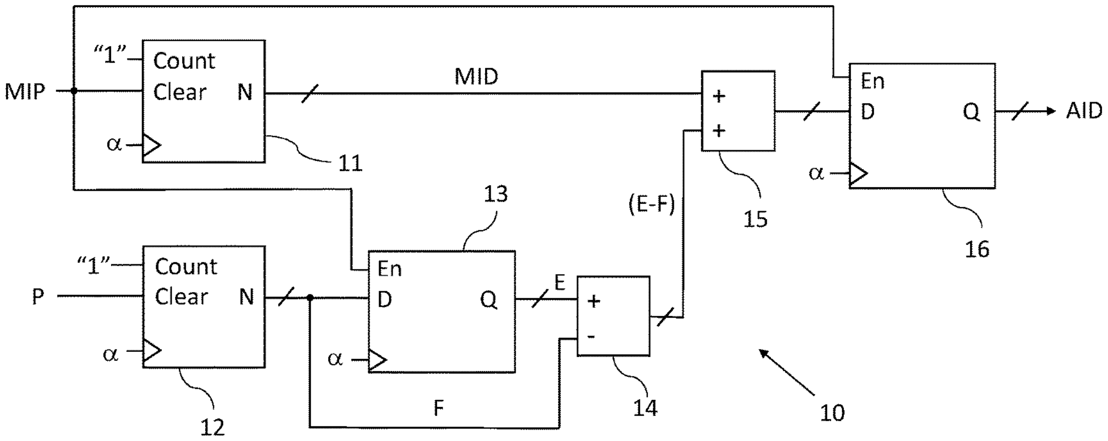
FIG. 7 schematically shows a first embodiment of a pulse frequency determination circuit according to the invention.

The interval duration determination unit 10 of FIG. 7 may be used as (part of an) interval duration determination unit 156 as illustrated in FIG. 6. The unit 10 comprises a first counter 11, a second counter 12, a first register 13, a first adder 14, a second adder 15, and a second register 16. In the embodiment shown, the registers 13 & 16 are each shown as a single D-flip-flop for the sake of clarity, but each register may consist of a plurality of flip-flops or similar elements for storing a single bit, as the registers 13 & 16 are arranged to store values consisting of multiple bits. It is noted that instead of D-flip-flops, other types of flip-flops may also be used, for example SR-flip-flops. The unit 10 receives not only the detection pulses P but also measurement interval pulses MIP which indicate the beginning of a new measurement interval MI. Referring to FIG. 4, a measurement interval pulse MIP is produced at each measurement interval beginning BMI. The duration of the measurement intervals MI may be fixed or may be user controlled.

Both counters 11 & 12 receive a clock pulse a, which may have a frequency which is at least twice as high as the expected maximum frequency of the pulses P, preferably at least an order of magnitude higher. A frequency of approximately 10 MHz may be suitable for most applications, in other applications 20 MHz may be used, for example. The count input of both counters is connected to the logical level "1", which typically is "high", such as the supply voltage. As a result, both counters will count forward at the rate of the clock pulse a and the output N will reflect the counter value (it is noted that the output N preferably is a parallel output).

The first counter 11 will be cleared (that is, reset) at each measurement period pulse MIP. This implies that the output N of the first counter 11 will represent the time since the last measurement period pulse MIP. This value, the measurement interval duration MID, is provided to the input D of the second flip-flop 16 via the second adder 15.

Similarly, the second counter 12 will be cleared (that is, reset) at each detection pulse P, which implies that the output of the second counter 12 will represent the time since the last detection pulse P. At each measurement interval pulse MIP, the first flip-flop 13 will be enabled by receiving the pulse MIP at its enable input, as a result of which the counter value at its input D will appear at the output Q at the next clock pulse, typically at the next leading edge of the clock pulse (as noted before, the clock frequency is assumed to be significantly higher than the average frequency of the detection pulses P, so the output can be assumed to react instantaneously). The output Q of the flip-flop will therefore represent the time elapsed since the last detection pulse P (which cleared the second counter 12) at the time of the beginning of the measurement interval, in other words the start interval or extension slot E (for example E1 in FIG. 4). This extension slot E will be provided, via the adders 14 & 15, to the input D of the second flip-flop 16. Due to the adders, the duration of the extension slot E will be added to the measurement interval duration MID.

The output of the second counter 12 is supplied, via a negative (that is, subtracting) input of the first adder 14 and a positive (that is, adding) input of the second adder 15, to the input D of the second flip-flop 16. As the second flip-flop 16 is enabled by each measurement interval pulse MIP, its output Q will assume the value of its input D at the moment of the measurement interval pulse MIP. As the output of the second counter 12 represents the time elapsed since the last detection pulse P, this is the end interval or final slot F (for example, F1) in FIG. 4 (note that the first flip-flop 13 outputs the previous extension slot E). Accordingly, the first adder 14 produces the difference (E−F), such as the time difference (E1−F1) in FIG. 4, while the second adder 15 produces, at the moment of the measurement interval pulse MIP, the value (MID+(E−F)), which is output by the second flip-flop 16 as the auxiliary interval duration AID when the second flip-flop 16 is enabled by a measurement interval pulse MIP. As a result, the auxiliary interval duration AID of a measurement interval will be produced at the beginning of the next measurement interval. As the measurement intervals are typically consecutive, without an intermediate time gap, the auxiliary interval duration AID will be produced at the end of the corresponding measurement interval.

Thus, the interval duration determination unit 10 of FIG. 7 produces the time duration of the auxiliary interval according to the invention. Dividing the number of pulses in the auxiliary interval by this time duration produces the average frequency for that interval. It is noted the first counter 11 may be replaced by a buffer when the measurement interval duration has not to be determined by the interval duration determination unit, for example when it is known in advance.

Figure 8:
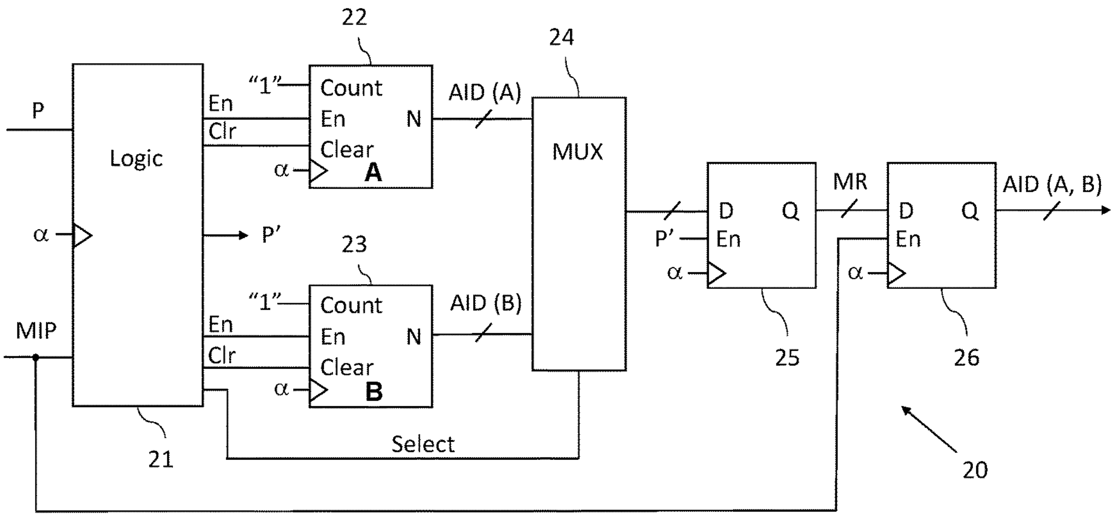
FIG. 8 schematically shows a second embodiment of a pulse frequency determination circuit according to the invention.

The interval duration determination unit 20 of FIG. 8 may alternatively be used as (part of) interval duration determination unit 156 in FIG. 6. While in the embodiment of FIG. 7 the auxiliary interval duration AID is calculated using the measurement interval duration MID, the extension slot E and the final slot F, as expressed by the formula AID=MID+E−F, the embodiment of FIG. 8 uses counters to directly determine the duration AID of the auxiliary interval. Although it would be possible to use a single counter in some applications, it is preferred to use two counters which alternatively determine the length of an auxiliary interval in subsequent measurement intervals. That is, a first counter A determines the auxiliary interval duration associated with a first measurement interval (e.g. MI1 in FIG. 5) while a second counter B determines the auxiliary interval duration associated with a second measurement interval (e.g. MI2 in FIG. 5) which immediately follows the first measurement interval. By alternatingly using two counters, immediately adjacent auxiliary interval durations can be accurately determined. Using two counters additionally allows handling measurement intervals in which no pulses occur.

The interval duration determination unit 20 shown by way of non-limiting example in FIG. 8 comprises a logic unit 21, a first counter 22 (counter A), a second counter 23 (counter B), a multiplexer 24, a first registers 25 and a second register 26, both represented by D-flip-flops. The registers 25 & 26 may each comprise a plurality of flip-flops or similar elements for storing bits. The logic unit 21, which may comprise several logical gates and flip-flops, is arranged for receiving the detection pulses P, the measurement interval pulses MIP and the clock pulse a. The logic unit 21 is arranged for producing, from the received pulses, enable and clear signals for both counters 22 & 23, a select signal for the multiplexer 24 and a derived pulse signal P'.

The measurement interval pulses MIP are also supplied to the flip-flop 25, as will be explained later in more detail. The clock pulse a may have a frequency of, for example, 10 MHz or 20 MHz, although other frequencies may also be suitable, as long as the clock frequency is at least twice the (highest) frequency of the detection pulses P.

Figure 9:
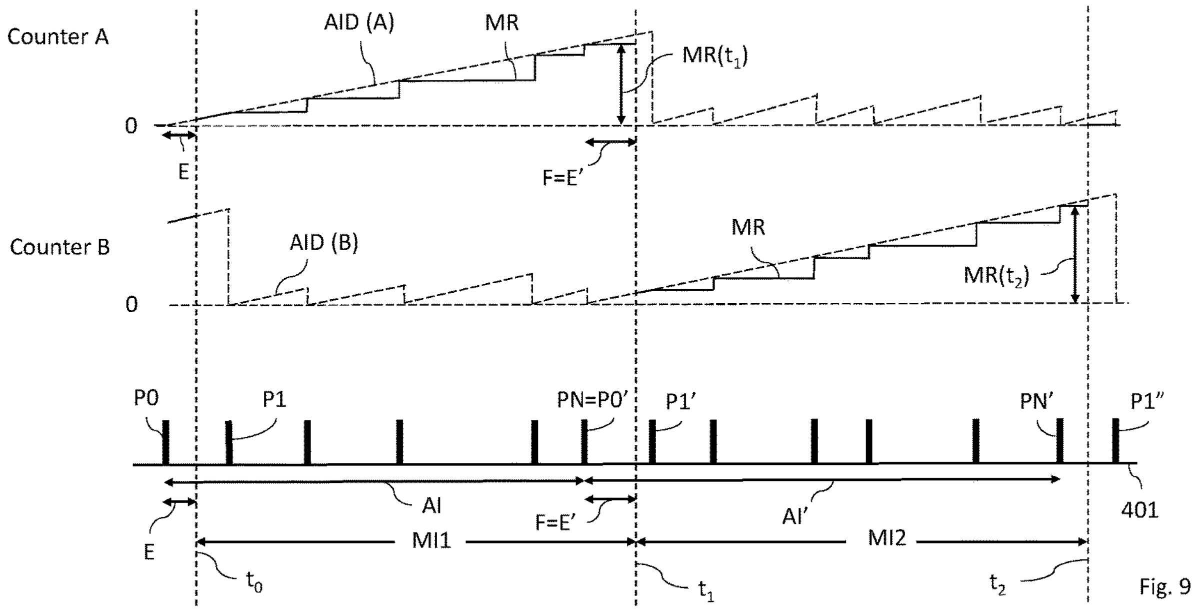
FIG. 9 schematically shows a timing diagram of the embodiment of FIG. 8.

The functioning of the interval duration determination unit 20 of FIG. 8 will be explained with reference to the timing diagram of FIG. 9, where processing of a series 401 of detection pulses P is schematically illustrated. For the sake of clarity, only a single series of pulses P is shown in FIG. 9, but it will be understood that the method illustrated in the timing diagram of FIG. 9 can be applied to multiple parallel series of pulses. In the example of FIG. 9, the first counter A (22 in FIG. 8) is the active counter during the first measurement interval MI1, while the second counter B (23 in FIG. 8) is the "active counter" during the second measurement interval MI2, the term "active counter" referring here to the counter of which the output value is used during the particular measurement interval. In the example of FIG. 9, both counters can count during the measurement intervals, but not both their outputs will be used.

The logic unit 21 shown in FIG. 8 is arranged to supply an enable (En) signal, which allows the respective counter to be the "active" counter, to one or both of the first counter A and the second counter B during both measurement intervals. In the embodiment shown, both counters effectively count clock pulses during both measurement intervals, as a logical "1" or "high" signal is provided to their count inputs. However, the second counter B receives a clear signal at every detection pulse P during the first measurement interval, while the first counter A receives a clear (Clr) signal at every detection pulse P during the second measurement interval. As a result, the counter value of the first counter A increases during the first measurement interval MI1 until the end of the first measurement interval is reached, while its counter value is registered at each pulse P, by using the flip-flops 25. That is, after the first measurement interval MI1 the counter (or timer) value of the first counter (or timer) A represents the auxiliary interval duration AID. This output value of the first timer 22 is passed via the multiplexer 24 to the D-input of the first flip-flop (first register) 25. This flip-flop also receives the clock a and the derived pulse signal P'. This derived pulse signal P' may either represent the occurrence of a pulse signal P or the (average) frequency of the pulses being equal to zero. The output signal of the first flip-flop 25 represents the output of the multiplexer 24 and may be referred to as multiplexer register MR. The actual value of MR may be equal to AID(A) or AID(B).

At each measurement interval pulse MIP, which marks the beginning of a new measurement period, the second flip-flop (second register) 26 is enabled and the value of the multiplexer register output by the first flip-flop 25 is output by second flip-flop 26. Thus, either AID(A) or AID(B) is output by the interval duration determination unit 20.

In accordance with the invention, the auxiliary interval AI includes the time period preceding the measurement interval from the last detection pulse, that is, the extension slot E in FIG. 9. At time to, the beginning of the first measurement interval MI1, the value of the first counter A represents the time since the preceding pulse P0. Similarly, at time $t_1$, the beginning of the second measurement interval MI2, the value of the second counter B represents the time since the preceding pulse P0'. It is noted that the sloping interrupted lines in FIG. 9 represent the counter values and hence AID(A) and AID(B), while the stepped uninterrupted lines represent Multiplexer Register values MR at the output of the first register 25.

It can be seen that during the first measurement interval MI1, the value of the first counter A increases to reach the value AID(A) at the end of the first measurement interval MI1, that is, at time $t_1$. Meanwhile, the value of the second counter B is reset at the first detection pulse P1 and at each subsequent detection pulse during the first measurement interval MI1. Additional gates may be provided to accommodate exceptions, such as the absence of any detection pulses during a measurement interval.

Figure 10:
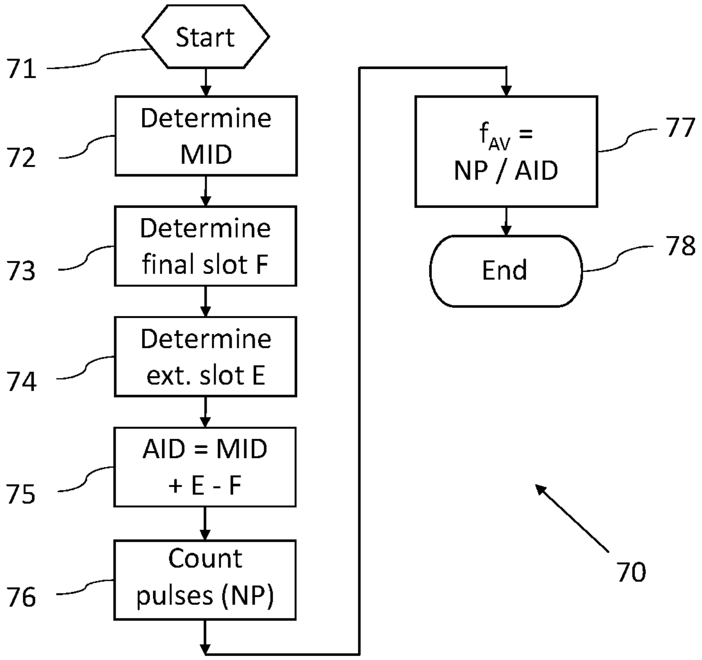
FIG. 10 schematically shows a flow diagram of an embodiment of the method according to the invention.

An exemplary embodiment of a method according to the invention is schematically illustrated in FIG. 10. This embodiment of the method corresponds with the functioning of the interval duration determination unit 10 of FIG. 7.

The method 70 is initiated at 71, after which a measurement interval duration MID is determined at 72. A final slot F is determined at 73 while an extension slot E is determined at 74, see also FIGS. 4 & 5 where the extension slots E and the final slots F are shown. It is noted that the order of 73 and 74 is arbitrary and that the order of these actions may be reversed, or they may be carried out in parallel. At 75, the auxiliary interval duration AID is determined by using the formula AID=MID+E−F (see also FIG. 7 for the corresponding circuitry). In action 76, which may take place in parallel with at least some of the preceding actions, the number of detection pulses during the auxiliary interval is counted, resulting in the number NP. At 77, the average frequency $f_{AV}$ of the detection pulses is determined using the formula $f_{AV}$=NP/AID. The method 70 may end at 78 or revert to action 72 to repeat the method for the next measurement interval.

The method of the invention may comprise determining an average frequency of pulses of at least two ion detectors, preferably at least two parallel ion detectors, in which case the method of the invention may be applied to the pulses generated by each ion detector. In some embodiments, three, four, five, six or more parallel ion detectors may be used, which may produce substantially simultaneous series of pulses. The parallel ion detectors may be of a single type or of two or more different types, such as Faraday cups, compact discrete dynodes (CODs), secondary electron multipliers (SEMs) and/or other detectors. It will be understood that the term "ion detector" may be generalized to "charged particle detectors", as the detected particles may also comprise electrons, for example.

It is noted that a pulse produced by an ion detector or by an electron detector can itself have a certain non-zero duration. To determine the time durations of periods as accurately as possible, a pulse may be said to occur at its first edge (typically its rising edge). Thus, the time duration between two pulses may mean the time duration between the rising edges of those pulses.

The method of the invention may comprise determining a value representing an ion current, in particular an ion current in a spectrometer. The value representing an ion current may be a frequency, which may be measured during one or more measurement intervals. The method of the invention may comprise determining an average frequency of pulses in at least two consecutive measurement intervals. As mentioned above, those consecutive measurement intervals are preferably contiguous.

In the method of the invention, the first pulse and the last pulse may be identical, in which only a single pulse occurs in the measurement interval. In that case, the auxiliary interval starts at the preceding pulse and ends at the single pulse. It can be seen that the method of the invention still produces a correct result.

When in a measurement interval no single pulse occurs, the frequency may be determined to equal zero. However, in some embodiments the frequency of a measurement interval in which no pulse occurs may be determined by using at least one adjacent measurement interval, for example both the preceding and following measurement interval. If in those measurement intervals (e.g. the current, the preceding and the following ones) a pulse occurred, the average frequency may be determined to be the frequency of the measurement interval in which no pulse occurred, thus resulting in a non-zero frequency. If in those measurement intervals no pulse occurred, the average frequency may be determined to equal zero. Adjacent measurement intervals may alternatively, or additionally, include more than one measurement interval following the measurement interval concerned, for example two or three further measurement intervals.

It will be understood that a measurement interval is a measurement time interval or measurement time period while an auxiliary interval is an auxiliary time interval or auxiliary time period. The invention allows multiple simultaneous series of pulses from multiple channels to be processed.

A computer program product may comprise instructions allowing a processor to carry out the method steps described above. A computer program product may be intangible or may comprise a tangible carrier, such as a memory stick or other memory device.

Various embodiments of the invention may be summarized as follows:

1. A method of determining in a spectrometer an average frequency of a series of ion detection pulses during a measurement interval, the method comprising:
   determining the duration of an auxiliary interval, wherein
      the auxiliary interval overlaps the measurement interval,
      the auxiliary interval begins at the last pulse preceding the measurement interval, and
      the auxiliary interval ends at the last pulse of the measurement interval,
   determining the number of pulses during the auxiliary interval, and
   dividing the number of pulses by the duration of the auxiliary interval so as to produce the average frequency.
2. The method according to embodiment 1, wherein, in the absence of a pulse before the measurement interval, the auxiliary interval begins at the beginning of the measurement interval.
3. The method according to embodiment 1 or 2, wherein, in the absence of a pulse during the measurement interval, the auxiliary interval ends at the end of the measurement interval and the average frequency preferably equals zero.
4. The method according to any of the preceding embodiments, comprising repeating the method for consecutive measurement intervals.
5. The method according to any of the preceding embodiments, wherein the pulses are produced by a voltage-to-frequency converter.
6. The method according to embodiment 5, wherein the voltage-to-frequency converter is coupled to a Faraday cup for detecting ions.
7. The method according to any of the preceding embodiments, wherein the pulses are produced by a compact discrete dynode (CDD) detector and/or a secondary electron multiplier (SEM) detector.
8. The method according to any of the preceding embodiments, wherein determining the duration of the auxiliary interval comprises:
   determining the duration of a start interval between the last pulse preceding the measurement interval and the beginning of the measurement interval,
   determining the duration of an end interval between the last pulse of the measurement interval and the end of the measurement interval,
   adding the duration of the start interval to the duration of the measurement interval, and
   subtracting the duration of the end interval from the duration of the measurement interval to obtain the duration of the auxiliary interval.
9. The method according to embodiment 8, wherein determining the duration of the start interval and/or determining the duration of the end interval comprises using at least one timer.
10. The method according to embodiment 9, further comprising resetting the at least one timer at each pulse.
11. The method according to any of embodiments 8 to 10, wherein the duration of the measurement interval is predetermined.
12. The method according to any of embodiments 8 to 10, wherein the duration of the measurement interval is determined using a further timer.
13. The method according to any of embodiments 1 to 7, wherein determining the duration of the auxiliary interval comprises:
   starting a timer at the beginning of the auxiliary interval, and
   recording the value of said timer at the end of the auxiliary interval, wherein the recorded value of said timer represents the duration of the auxiliary interval.
14. The method according to embodiments 4 and 13, wherein determining the duration of a consecutive auxiliary interval comprises:
   starting a further timer at the beginning of the consecutive auxiliary interval, and
   recording the value of said further timer at the end of the consecutive auxiliary interval, wherein the recorded value of said further timer represents the duration of the consecutive auxiliary interval.
15. The method according to embodiment 14, wherein the timer and the further timer are used alternatingly.
16. A software program product comprising instructions allowing a processor to carry out the method according to any of the preceding embodiments.
17. A device for determining in a spectrometer an average frequency of a series of ion detection pulses during a measurement interval, the device comprising:
   circuitry for determining the duration of an auxiliary interval, wherein the auxiliary interval overlaps the measurement interval, the auxiliary interval begins at the last pulse preceding the measurement interval, and the auxiliary interval ends at the last pulse within the measurement interval, circuitry for determining the number of pulses during the auxiliary interval, and circuitry for dividing the number of pulses by the duration of the auxiliary interval so as to produce the average frequency.

18. The device according to embodiment 17, further comprising circuitry for receiving the pulses from a voltage-to-frequency converter.

19. The device according to embodiment 17 or 18, further comprising circuitry for receiving the pulses from a compact discrete dynode (CDD) detector and/or a secondary electron multiplier (SEM) detector.

20. The device according to embodiment 17 or 18, wherein the circuitry for determining the duration of the auxiliary interval comprises:

a start timer for determining the duration of a start interval between the last pulse preceding the measurement interval and the beginning of the measurement interval, an end timer for determining the duration of an end interval between the last pulse preceding the measurement interval and the beginning of the measurement interval, and a combinatorial circuit for adding the duration of the start interval to the duration of the measurement interval and subtracting the duration of the end interval from the duration of the measurement interval, to obtain the duration of the auxiliary interval.

21. The device according to embodiment 20, wherein the start timer and the end timer are constituted by a single timer and a flip-flop, wherein:

a clear input of the single timer is arranged to receive the pulses, a data input of the flip-flop is connected to an output of the single timer, an enable input of the flip-flop is arranged to receive a measurement initiation pulse representing the beginning of the measurement interval, and the output of the single timer and the output of the flip-flop are each connected to an input of the combinatorial circuit so as to produce the difference between the start interval and the end interval.

22. The device according to embodiment 21, further comprising an additional flip-flop, wherein:

the combinatorial circuit is arranged to receive the duration of the measurement interval, a data input of the additional flip-flop is connected to an output of the combinatorial circuit, an enable input of the flip-flop is arranged to receive the measurement initiation pulse representing the beginning of the measurement interval, so that an output of the flip-flop produces the duration of the auxiliary interval.

23. The device according to embodiment 21 or 22, further comprising an additional timer for determining the duration of the measurement interval, wherein:

a clear input of the additional timer is arranged to receive the measurement initiation pulse representing the beginning of the measurement interval, and an output of the additional timer is connected to an input of the combinatorial circuit, so that the additional timer supplies the duration of the measurement interval to the combinatorial circuit.

24. The device according to any of embodiments 17 to 19, wherein the circuitry for determining the duration of the auxiliary interval comprises:

a first timer and a second timer for producing a first timer value and a second timer value respectively, a multiplexer for selecting one of the first timer value and the second timer value, a flip-flop for recording the selected timer value at the end of the auxiliary interval, and a logic unit for supplying control signals to the timers, the multiplexer and the flip-flop, wherein during a first measurement interval the second timer is cleared at each detection pulse, wherein during a second, subsequent measurement interval the first timer is cleared at each detection pulse, and wherein the first timer value at the end of the first measurement interval represents the duration of the associated auxiliary interval.

25. A mass spectrometer, comprising a device according to any of embodiments 17 to 24.

26. The mass spectrometer according to embodiment 25, further comprising at least one voltage-to-frequency converter and at least one Faraday cup.

27. The mass spectrometer according to embodiment 25 or 26, further comprising:

at least one compact discrete dynode, and/or at least one secondary electron multiplier, and circuitry for counting pulses produced by the at least one compact discrete dynode and/or at least one secondary electron multiplier during a measurement interval.

28. A method of determining in a spectrometer the number of pulses of ion detection pulses during a measurement interval, the method comprising:

determining the duration of an auxiliary interval, wherein the auxiliary interval overlaps the measurement interval, the auxiliary interval begins at the last pulse preceding the measurement interval, and the auxiliary interval ends at the last pulse of the measurement interval, and determining the number of pulses during the auxiliary interval.

It will be understood by those skilled in the art that the invention is not limited to the embodiments shown and/or described above and that many additions and modifications can be made without departing from the scope of the invention as defined in the appending claims.

The invention claimed is:

1. A method of determining in a spectrometer an average frequency of a series of ion detection pulses during a measurement interval, the method comprising:

determining the duration of an auxiliary interval, wherein the auxiliary interval overlaps the measurement interval, the auxiliary interval begins at the last pulse preceding the measurement interval, and the auxiliary interval ends at the last pulse of the measurement interval;

determining the number of pulses during the auxiliary interval; and dividing the number of pulses by the duration of the auxiliary interval so as to produce the average frequency.

2. The method according to claim 1, wherein, in the absence of a pulse before the measurement interval, the auxiliary interval begins at the beginning of the measurement interval.

3. The method according to claim 1, wherein in the absence of a pulse during the measurement interval, the auxiliary interval ends at the end of the measurement interval and the average frequency preferably equals zero.

4. The method according to claim 1, comprising repeating the method for consecutive measurement intervals.

5. The method according to claim 1, wherein the pulses are produced by a voltage-to-frequency converter, the voltage-to-frequency converter preferably being coupled to a Faraday cup for detecting ions.

6. The method according to claim 1, wherein the pulses are produced by a compact discrete dynode detector and/or a secondary electron multiplier detector.

7. The method according to claim 1, wherein determining the duration of the auxiliary interval comprises:

determining the duration of a start interval between the last pulse preceding the measurement interval and the beginning of the measurement interval, determining the duration of an end interval between the last pulse of the measurement interval and the end of the measurement interval, adding the duration of the start interval to the duration of the measurement interval, and subtracting the duration of the end interval from the duration of the measurement interval to obtain the duration of the auxiliary interval.

8. The method according to claim 7, wherein determining the duration of the start interval and/or determining the duration of the end interval comprises using at least one timer, the method preferably further comprising resetting the at least one timer at each pulse.

9. The method according to claim 8, wherein the duration of the measurement interval is predetermined or is determined using a further timer.

10. The method according to claim 1, wherein determining the duration of the auxiliary interval comprises:

starting a timer at the beginning of the auxiliary interval, and recording the value of said timer at the end of the auxiliary interval, wherein the recorded value of said timer represents the duration of the auxiliary interval.

11. The method according to claim 4, wherein determining the duration of a consecutive auxiliary interval comprises:

starting a further timer at the beginning of the consecutive auxiliary interval, and recording the value of said further timer at the end of the consecutive auxiliary interval, wherein the recorded value of said further timer represents the duration of the consecutive auxiliary interval, and wherein the timer and the further timer are preferably used alternatingly.

12. A computer program product for determining in a spectrometer an average frequency of a series of ion detection pulses during a measurement interval, the computer program product including one or more non-transitory computer-readable media having computer programs instructed stored therein, the computer program instructions being configured such that, when executed by one or more computing devices, the computer program instructions cause the one or more computing devices to:

determine the duration of an auxiliary interval, wherein the auxiliary interval overlaps the measurement interval, the auxiliary interval begins at the last pulse preceding the measurement interval, and the auxiliary interval ends at the last pulse of the measurement interval;

determine the number of pulses during the auxiliary interval; and divide the number of pulses by the duration of the auxiliary interval so as to produce the average frequency.

13. A device for determining in a spectrometer an average frequency of a series of ion detection pulses during a measurement interval, the device comprising:

Circuitry for determining the duration of an auxiliary interval, wherein the auxiliary interval overlaps the measurement interval, the auxiliary interval begins at the last pulse preceding the measurement interval, and the auxiliary interval ends at the last pulse within the measurement interval, circuitry for determining the number of pulses during the auxiliary interval, and circuitry for dividing the number of pulses by the duration of the auxiliary interval so as to produce the average frequency.

14. The device according to claim 13, further being arranged for receiving the pulses from a voltage-to-frequency converter, from a compact discrete dynode detector and/or from a secondary electron multiplier detector.

15. The device according to claim 13, wherein the circuitry for determining the duration of the auxiliary interval comprises:

a start timer for determining the duration of a start interval between the last pulse preceding the measurement interval and the beginning of the measurement interval, an end timer for determining the duration of an end interval between the last pulse preceding the measurement interval and the beginning of the measurement interval, and a combinatorial circuit for adding the duration of the start interval to the duration of the measurement interval and subtracting the duration of the end interval from the duration of the measurement interval, to obtain the duration of the auxiliary interval, wherein the start timer and the end timer are preferably constituted by a combination of a single timer and a flip-flop, and wherein:

a clear input of the single timer is arranged to receive the pulses, a data input of the flip-flop is connected to an output of the single timer, an enable input of the flip-flop is arranged to receive a measurement initiation pulse representing the beginning of the measurement interval, and the output of the single timer and the output of the flip-flop are each connected to an input of the combinatorial circuit so as to produce the difference between the start interval and the end interval.

16. The device according to claim 13, wherein the circuitry for determining the duration of the auxiliary interval comprises:

a first timer and a second timer for producing a first timer value and a second timer value respectively, a multiplexer for selecting one of the first timer value and the second timer value, a flip-flop for recording the selected timer value at the end of the auxiliary interval, and a logic unit for supplying control signals to the timers, the multiplexer and the flip-flop, wherein the device is arranged for:

clearing the second timer at each detection pulse during a first measurement interval, and clearing the first timer at each detection pulse during a second, subsequent measurement interval, wherein the first timer value at the end of the first measurement interval represents the duration of the associated auxiliary interval.

17. A mass spectrometer comprising a circuit for determining an average frequency of a series of ion detection pulses during a measurement interval, the circuit comprising:

circuitry for determining the duration of an auxiliary interval (AI), wherein the auxiliary interval overlaps the measurement interval, the auxiliary interval begins at the last pulse preceding the measurement interval, and the auxiliary interval ends at the last pulse within the measurement interval;

circuitry for determining the number of pulses during the auxiliary interval; and circuitry for dividing the number of pulses by the duration of the auxiliary interval so as to produce the average frequency.

* * * * *